United States Patent [19]

Deane et al.

[11] Patent Number: 4,466,622
[45] Date of Patent: Aug. 21, 1984

[54] COMPOUND DYNAMIC SEAL FOR ROLLING CUTTER DRILL BIT

[75] Inventors: John D. Deane, Houston; Robert J. Kotch, Humble, both of Tex.

[73] Assignee: Reed Rock Bit Company, Houston, Tex.

[21] Appl. No.: 419,844

[22] Filed: Sep. 20, 1982

Related U.S. Application Data

[63] Continuation of Ser. No. 171,683, Jul. 24, 1980.

[51] Int. Cl.$^3$ ............................................. F16J 15/16
[52] U.S. Cl. .................................... 277/92; 175/371; 384/94
[58] Field of Search .................... 277/92, 83; 308/8.2; 175/371, 372

[56] References Cited

U.S. PATENT DOCUMENTS

| | | | |
|---|---|---|---|
| 3,452,995 | 7/1969 | Engelking | 277/92 |
| 3,656,764 | 4/1972 | Robinson | 277/92 |
| 3,765,495 | 10/1973 | Murdoch et al. | 175/371 |
| 4,037,673 | 7/1977 | Justman | 175/371 |
| 4,094,514 | 6/1978 | Johnson | 277/92 |
| 4,176,848 | 12/1979 | Lafuze | 277/92 |
| 4,194,795 | 3/1980 | Rife | 277/92 |
| 4,256,315 | 3/1981 | Larson et al. | 277/92 |

Primary Examiner—Robert I. Smith
Attorney, Agent, or Firm—Carl A. Rowold

[57] ABSTRACT

A seal assembly for a rotary drill bit of the type comprising a bearing journal constituting a first bearing member, and roller cutter having a blind end bore therein, constituting a second bearing member, receiving the journal and an annular recess at the open end of the bore, the annular recess and journal defining an annular cavity in the bit. The seal assembly is positioned in the cavity for holding lubricant in the bit and comprises a ring of relatively rigid material movable with respect to the journal and the roller cutter in the longitudinal axial direction thereof and having a sealing face. An elastomeric seal member sealingly engages the movable ring and one of the bearing members and biases the ring to a position in which the sealing face of the ring is in sealing engagement. A projection and recess arrangement on the ring and the stated one bearing member enables the ring to move along this bearing member, while holding it in predetermined angular position thereon, whereby the ring and this bearing member rotates together relative to the other bearing member, with the movable ring biased to its sealing position.

6 Claims, 7 Drawing Figures

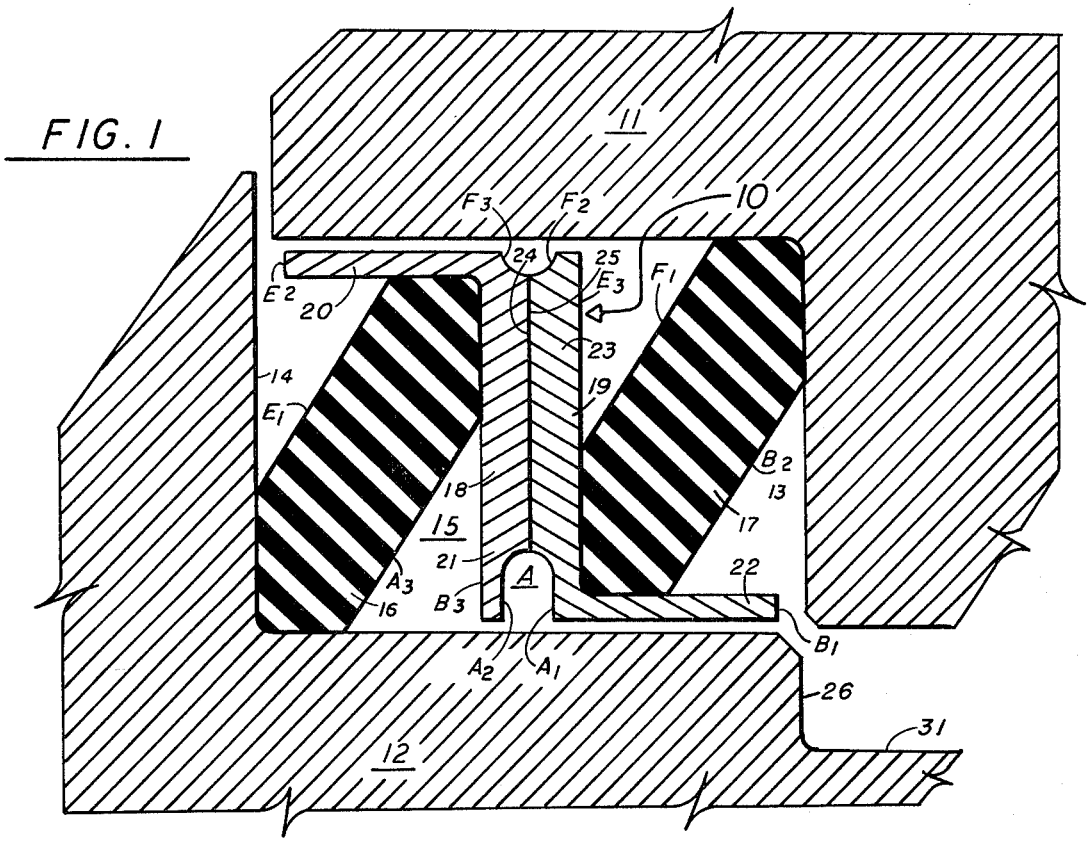
FIG. 1
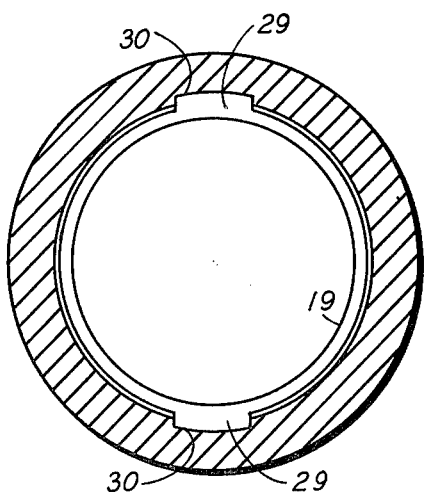
FIG. 2
FIG. 3

COMPOUND DYNAMIC SEAL FOR ROLLING CUTTER DRILL BIT

This is a continuation of application Ser. No. 171,683, filed July 24, 1980.

BACKGROUND OF THE INVENTION

Normally, rolling cutter drill bits such as oil well bits, bias hole bits and mining bits, may be classified as either "sealed" or "unsealed" bits. The sealed bits, which are usually the premium line of bits, utilize elastomeric seals between the rotating cutters and the bearing journals to prevent intrusion of dirt, sand, rock cuttings, corrosive liquids and other contaminants into the bearing area. This reduction of detritus into the bearing area prolongs the life of the bearings and extends the drilling life of the bit. One such premium sealed bit having particularly good elastomeric journal bearing seals is that disclosed in U.S. Pat. No. 4,037,673, granted to Daniel B. Justman on July 26, 1977, which patent is herein incorporated by reference.

In the Justman patent, the drawing reveals a frustoconical rolling cutter 15 which is rotatably mounted on a bearing shaft 14 by bearings 18 and 19a. An elastomeric sealing ring 25 is located in an internal groove 24 in cutter 15 and sealingly engages shaft 14. The sealing ring can be an O-ring or be rectangular in cross-section, and is placed in hoop compression. The seal preferably is static with respect to the cutter and dynamic with respect to the shaft.

Although the Justman drilling bit sealing system is an improvement over the seals that were conventional at that time, such as that disclosed in U.S. Pat. No. 3,765,495, it does suffer from one disadvantage also affecting the other known bit sealing systems. Conventional bit seals utilize a dynamic interface between the elastomeric seal member and either the bearing journal, the cutter, or both. As a result of the continuous movement of the elastomeric seal against one or both of the metal elements, a rapid wear and deterioration of the seal surface usually occurs. Efforts to slow this wear and deterioration have included the shielding type of structure disclosed in the aformentioned Justman patent and a polishing of the metal faces which contact the seal to a high surface smoothness.

The present invention eliminates the elastomeric seal deterioration caused by sliding contact with metal surfaces. The invention does this by replacing the usual single elastomeric seal with a compound elastomeric and metal sealing system with the metal components providing the dynamic seal against each other, and the elastomeric components providing static seals within the rolling cutter drill bit.

BRIEF DESCRIPTION OF THE DRAWINGS

FIG. 1 is an enlarged partial longitudinal central section of a drill bit having a sealing system of the present invention in place between a rolling cutter and a bearing journal of the bit.

FIG. 2 is an radial section through the bit showing a movable ring of the assembly and interengaging means for holding the ring in a predetermined angular position on the roller cutter.

FIG. 3 is a view similar to FIG. 2 showing a second ring and interengaging means therefor.

DESCRIPTION OF THE PREFERRED EMBODIMENTS

Figure 4:
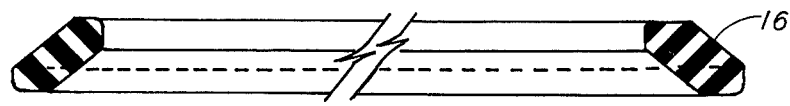
FIGS. 4 and 4A are longitudinal central sections through elastomeric seal members of the assembly.
Figure 4A:
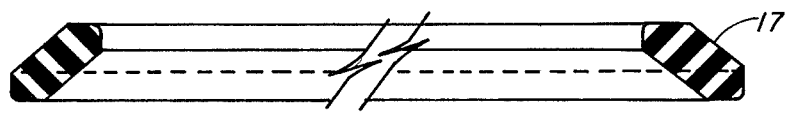

The present invention discloses a compound metal-to-metal dynamic seal for use in a rolling cutter drill bit. The metal-to-metal seal utilizes static elastomeric seal members for sealing against the bearing journal and the cutter and a pair of L-shaped metal rings for dynamically sealing against each other. Referring to FIG. 1, the sealing system 10 is shown in section, as installed in a rotary drill bit of the type having a generally cylindrical bearing journal, constituting a first bearing member of the bit, and a frustoconical roller cutter rotatably mounted on the journal, constituting a second bearing member. In the figure, a portion 11 of the rotating cutter is shown in close relationship with a bearing journal 12 of a rolling cutter drill bit. The cutter 11 has a blind end bore of generally circular section in the base thereof receiving the journal and an L-shaped annular recess 13 at the open end of the bore. The bearing journal 12 a free end, an attached end and a generally radially extending wall 14 at the attached end. The recess 13 and the journal 12 work in conjunction to form an annular seal cavity 15 therebetween. A pair of annular seal members 16 and 17 are located respectively against the bearing journal 12 and the cutter 11 and are of a conical or funnel configuration as shown in FIGS. 4 and 4A. The members 16 and 17 preferably are formed from some elastomer having the desirable properties for the particular application of the bit being made. For instance, in high temperature applications, a temperature-resistant elastomer, such as a silicone rubber, would be a particularly good material from which to manufacture seal members 16 and 17. Since the seals are used in static sealing only, it is not necessary that the material selected have a property of resisting deterioration from contact against a sliding metal surface. Other properties could be utilized in selecting the elastomer to be used in the seals. For example, rather than a high-temperature resistant elastomer, the bit maker may want to utilize the bit in a corrosive atmosphere, such as a well having high concentrations of hydrogen sulfide. In that instance, a hydrogen sulfide-resistant elastomer would be the choice for seal members 16 and 17.

Figure 5:
FIG. 5 is a longitudinal central section through one of the movable rings.
Figure 6:
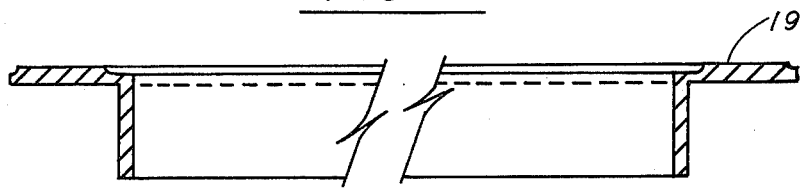
FIG. 6 is a longitudinal central section through the other movable ring.

The dynamic portion of the compound sealing system 10 comprises the complementary mating rings 18 and 19 made of a relatively rigid material such as metal. The rings are each L-shaped in section, as shown in FIGS. 5 and 6. The material of which rings 18 and 19 are made, preferably would be a steel alloy, a chrome steel or some more exotic compound such as copper beryllium alloy. Hard ring 18, which constitutes an outer or first ring, comprises a retainer leg 20 and a sealing leg 21. Likewise, the ring 19 constitutes an inner or second ring of the seal assembly and comprises a retainer leg 22 and a sealing or abutting leg 23. The abutting legs 21 and 23 each have a smooth sealing faces 24, 25 (respectively) located thereon for sealing dynamic engagement with the adjacent ring surface.

As shown in FIGS. 1–3, the rings are so sized relative to the bearing members (i.e., the journal and the roller cutter) as to be movable with respect thereto in the longitudinal axial direction of the bearing members. Each of the elastomeric seal members 16, 17 extend between and are in sealing engagement with one of the rings 18, 19 and one of the bearing members 11, 12. In addition, each seal member biases the respective ring to move in the longitudinal axial direction of the bearing members toward the other bearing member to a position in which the sealing face of the ring is in sealing engagement with the other ring.

More particularly, the ring 18 is biased away from flange 14 by the resiliency of elastomeric seal 16, which is preferably in a compressed state while in place in seal cavity 15. Likewise, seal ring 19 is biased toward flange 14 by the resiliency of elastomeric seal 17, which also preferably is maintained in compressed state while in place in seal cavity 15. This biasing of rings 18 and 19 inwardly and outwardly, respectively, results in a constant abutting of seal surfaces 24 and 25, which abutment comprises the dynamic sealing portion of assembly 10. The elastomeric members thus serve to perform a sealing formation with the bearing members and the rings, and to bias the rings together into sealing engagement. Accordingly, each elastomeric member constitutes both seal means and biasing means of the seal assembly.

Interengageable means independent of the seal members 16, 17 and comprising a pair of projection and recess arrangements, one arrangement being on one ring and the journal and the other arrangement being on other ring and the roller cutter, hold the rings in predetermined or fixed angular position on their respective bearing members, while allowing the rings to move along the bearing members in the longitudinal axial direction thereof. More particularly, ring 18 is maintained in fixed angular position with respect to bearing journal 12 by the provision of flats on shoulder 26 or shaft 12, as shown in FIG. 3. The flats 27 on shoulder 26 are arranged to engage a pair of opposed tabs 28 formed on the inner diameter of ring 18. In a similar fashion, movable ring 19 is maintained in fixed angular position with respect to cutter 11 by the provision of a pair of outward projecting ears or tabs 29 formed on ring 19, which tabs are arranged to fit into a pair of complementary recesses 30 formed internally in cutter 11. Thus, by the provisions of flats 27 and engaging contact with tabs 28, plus the ears 29 engaging recesses 30, the metal rings 18 and 19 are secured against rotation with respect to their adjacent bit components. As a result, as the cutter 11 rotates about the bearing shaft 12, ring 19 will slide along ring 18 in sealing engagement and will remain biased thereagainst by the seal members 16 and 17.

From the foregoing description of the seal assembly 10, it can be seen that a highly efficient static seal is provided against the bearing members by rings 16 and 17, and a highly efficient dynamic seal is provided between the relatively rotating rings 18 and 19. The high deterioration effect commonly associated with dynamic seals is greatly reduced by shifting all dynamic contact to the mating metal surfaces 24 and 25, and utilizing the resilient sealing ability and spring effect of elastomers in seals 16 and 17.

In addition to the advantages and features described above, an additional feature of the compound sealing system 10 involves a pressure relief function for bleeding off excess pressure in the lubricant area of the drilling bit. The lubricated portions of the drilling bit comprise the interior of the cutter 11 having the bearings and bearing shaft 31 located therein. The sealing system 10, while primarily designed to block detritus and contaminants from entering the bearing system, also serves as a retention system for preventing escape of lubricant in the bearing area. In some instances because of heat buildup during the drilling operations and other reasons relating to the properties of the lubricant, pressure will build up inside the lubricated areas which might result in a blow-out of the sealing system which would allow the lubricant to escape from the confines of the drill bit. When such a blow-out occurs, normally the sealing ability of the journal seals is destroyed or greatly deteriorated.

The present invention allows for pressure buildups beyond the normally rated capacity for providing a pressure relief system. This pressure relief system generally comprises the pressure relief area denoted in FIG. 1 at A. This comprises recesses A1 and A2 formed in peripheral edge margins of rings 19 and 18, respectively, in communication with lubricant in the bit. This is the pressure actuation area of the seal assembly 10. A similar but smaller area, F, is located at the opposite ends of shoulders 21 and 23. The areas $A_1$ and $A_2$ are selected to be sufficiently larger than the opposing areas such that when the pressure increase or pressure excess of the lubricant in the bearing area along shaft 31 reaches a critical stage relative to the pressure of drilling fluid at the exterior of the drill bit, this excess pressure acting on area A provides a differential pressure force sufficient to overcome the resiliency of seal members 16 and 17 so that surfaces 24 and 25 are temporarily forced apart to allow exit of the pressurized lubricant therebetween.

Once the excess pressure is drained off through the gap between surfaces 24 and 25, the differential pressure between points A and B will be reduced sufficiently so that the resiliency of seal members 16 and 17 will close the temporary pressure relief gap and prevent entry of any contaminants or detritus into the bearing area. The dynamic metal-to-metal seal will then continue to function as before and remain in contact until such point in time that any future pressure excesses require the bleeding of additional lubricant.

In FIG. 1, those areas which are responsive to excess pressure buildup and tend to force the seal open are labeled at A and comprise $A_1$, $A_2$ and $A_3$. $A_1$ and $A_2$ are the curved, peripheral recesses formed in rings 18 and 19. Surface $A_3$ is the inward conical surface of member ring 16. Those areas tending to react to lubricant pressure to force surfaces 24 and 25 into tighter engagement are labeled at B, and more specifically comprise area $B_1$ which is the annular area at the end of arm 22; area $B_2$ which is the radially inward conical surface of seal member 17; and area $B_3$ which is the portion of arm 21, which is on the radially outward surface extending below seal member 16. Mathematically, for a pressure differential to exit, area A must exceed area B. The excess of area A over area B may be denoted as area C. This is defined as $A - B = C$.

In order for an excess of pressure in the lubricant around shaft 31 to be bled off, the pressure acting on area C must exceed the combined spring force of seal members 16 and 17 pushing metal rings 18 and 19 together. Mathematically, this would be written as Force (F) equals to Pressure (P) times Differential Area (C), $(F = C \times P)$. To provide opening and bleeding of excess pressure, F must be greater than Spring Force (X) of seal member 16 and Spring Force (Y) of seal member 17 $(F > X + Y)$. In order to simplify the calculation of pressures within the bearing area, the areas of the seal exposed to the hydrostatic pressure of the drill fluid, which areas are denoted at E and F, preferably are made equal so that the pressure from outside the seal assembly is balanced and neither tends to open nor close the seal assembly. Thus, for pressure balancing with respect to pressures in the borehole external to the seal assembly 10, $E1+E2+E3=F1+F2+F3$.

If desirable, the areas E and F could be selected to provide a positive sealing effect from external pressures by selecting areas E larger than areas F so that a pressure differential is established with respect to external pressure, which pressure differential serves to hold the rings into tighter abutment with each other. Thus, additional different pressure effects can be achieved with the seal assembly of this invention merely by varying the depth of pressure surfaces F and A.

It can be seen from the description above that the present invention discloses a compound seal system particularly advantageous when used in a rolling cutter drill bit. The present invention offers distinct advantages over the conventional seals now in use in the industry. The most prevalent type of seal currently in use is the O-ring, or similar type single elastomeric seal, which provides both dynamic and static sealing, and is therefore subject to rapid wear and deterioration. A second type of seal is that disclosed by our co-pending application filed on the same date herewith entitled, "Dynamic Seal for Rolling Cutter Drill Bit", now U.S. Pat. No. 4,306,727, isssued Dec. 22, 1981. In our co-pending application, a two-element sealing system is disclosed utilizing an elastomeric Belleville-type seal member and a ring for the dynamic sealing. In that invention, the seal abuts one of the rotating members and provides a metal-to-metal dynamic seal. The surface abutted by the metal ring must be smoothly finished and free from distortion and defects to achieve maximum sealing ability. During the drilling operation, when the rotating parts of the drill bit are subject to high forces and temperatures, in some instances the sealing surface on the rotating bit component becomes distorted through heat and/or pressure distortion. In that instance, the sealing capability is decreased in the dynamic seal area.

For those particular applications wherein the drilling bit will be subjected to high stresses and high temperatures, such as in drilling of thermal or steam wells, the present invention provides additional advantages over those of our co-pending application. In this invention, the metal-to-metal seal occurs between the two metal sealing rings located near the center of the seal assembly and sealing capability is relatively independent of maintaining a smooth, true, flat sealing surface on one of the rotating bit components. Since the sealing surfaces are formed on the two abutting metal rings in the present invention, and these rings are relatively insulated from the high stresses and temperatures to which the bit parts are subjected, said insulation being primarily due to the resiliency of the elastomeric seal rings, the metal sealing faces on the rings do not suffer the distortion and warpage that a surface on the cutter or journal might undergo.

Likewise, the present invention provides capabilities for varying the pressure differentials across the seal assembly to allow excess pressure buildup in the bit lubricant to be bled off prior to reaching critical pressure, thereby avoiding blowout of the seal assembly. The provision of a metal-to-metal dynamic seal and elastomeric static seal provides the opportunity to select elastomers having properties which tend to resist failure from high temperatures and/or corrosive fluids since there is little requirement that the elastomer have good wear and erosion resistance properties. The elimination of the requirement of dynamic sealing in the elastomer thus allows emphasis on other properties of the elastomer. Likewise, the elastomer provides sealing against the bit components and a resilient urging force of the metal seals against each other. The two metal seals are insulated from distorting heat and pressure and serve to dynamically seal the system against contaminants from outside the bit. The hard metal of the seals provides a tough, long-lasting, dynamic seal for the drill bit assembly.

Although certain preferred embodiments of the invention have been herein described in order to provide an understanding of the general principles of the invention, it will be appreciated that various changes and innovations can be effected in the described seal assembly without departing from these principles. For example, whereas the elastomeric seal rings are depicted as being frusto-conical, circular shapes, or "Belleville-spring types", it is clear that other geometric configurations such as ovals could likewise be utilized. The invention therefore, is declared to cover all changes and modifications of the specific example of the invention herein disclosed for purposes of illustration which do not constitute departures from the spirit and scope of the invention.

The embodiments of the invention in which an exclusive property or privilege is claimed are defined as follows:

1. A seal assembly for a rotary drill bit of the type comprising a generally cylindrical bearing journal constituting a first bearing member of the bit, and a generally frustoconical roller cutter rotatably mounted on the journal constituting a second bearing member of the bit, the journal and the roller cutter together defining an annular cavity therebetween in the bit, said seal assembly being positioned in the cavity for holding lubricant in the bit, said seal assembly comprising:

a ring of relatively rigid material in the cavity, the ring being so sized relative to said bearing members as to be movable with respect thereto in the longitudinal axial direction of the bearing members, and having a generally radially extending face constituting a sealing face thereof;

seal means of generally annular configuration in the cavity between and sealingly engageable with the movable ring and one of the bearing members;

means for biasing the ring to move in the longitudinal axial direction of the bearing members toward the other bearing member to a position in which the sealing face of the ring is in sealing relationship; and interengageable means, independent of the seal means and the biasing means, on the movable ring and on said one bearing member for enabling the ring to move along said one bearing member in the longitudinal axial direction thereof, while holding the ring in a predetermined angular position relative to said one bearing member, whereby the other bearing member, upon rotation relative to said one bearing member, also rotates with respect to said movable ring while biased to its sealing position.

2. A seal assembly as set forth in claim 1 wherein the interengageable means comprises a projection and recess arrangement on the movable ring and said one bearing member.

3. A seal assembly as set forth in claim 1 wherein the seal means comprises a frustoconical member of elastically deformable material and further constitutes said biasing means.

4. A seal assembly as set forth in claim 1 wherein the seal assembly comprises a pair of said movable rings, a pair of said seal means, and a pair of said biasing means, the biasing means biasing the pair of movable rings into sealing engagement with each other at their sealing faces.

5. A seal assembly as set forth in claim 4 wherein the seal assembly comprises a pair of interengageable means, one being on one of said rings and said journal, and the other being on the other ring and said roller cutter, the rings thus rotating relative to each other on relative rotation of the roller cutter on the journal.

6. A seal assembly as set forth in claim 5 wherein the sealing faces of the movable rings have recesses in the annular edge margins thereof in communication with the lubricant in the bit for causing the movable rings to move apart upon the pressure of the lubricant exceeding the pressure of drilling fluid at the exterior of the bit by a predetermined amount.

* * * * *